(12) United States Patent
Brown et al.

(10) Patent No.: US 8,456,528 B2
(45) Date of Patent: Jun. 4, 2013

(54) SYSTEM AND METHOD FOR MANAGING THE INTERACTION OF OBJECT DETECTION AND TRACKING SYSTEMS IN VIDEO SURVEILLANCE

(75) Inventors: Lisa M. Brown, Pleasantville, NY (US); Jonathan H. Connell, II, Cortlandt-Manor, NY (US); Arun Hampapur, Norwalk, CT (US); Sharathchandra U. Pankanti, Manhasset, NY (US); Andrew W. Senior, New York, NY (US); Ying-li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 11/688,524

(22) Filed: Mar. 20, 2007

(65) Prior Publication Data

US 2008/0231709 A1    Sep. 25, 2008

(51) Int. Cl.
*H04N 5/232*    (2006.01)

(52) U.S. Cl.
USPC ........................................ 348/169; 382/103

(58) Field of Classification Search
CPC .... G01S 3/7864; G01S 3/7865; H04N 5/23254
USPC ........................................ 348/169; 382/103
See application file for complete search history.

(56) References Cited

U.S. PATENT DOCUMENTS

| | | | |
|---|---|---|---|
| 6,445,409 B1 * | 9/2002 | Ito et al. | 348/155 |
| 6,731,799 B1 * | 5/2004 | Sun et al. | 382/173 |
| 6,999,600 B2 * | 2/2006 | Venetianer et al. | 382/103 |
| 7,825,954 B2 * | 11/2010 | Zhang et al. | 348/169 |
| 7,929,730 B2 * | 4/2011 | Huang et al. | 382/103 |
| 8,073,197 B2 * | 12/2011 | Xu et al. | 382/103 |
| 8,159,536 B2 * | 4/2012 | Wang et al. | 348/152 |
| 2003/0058237 A1 * | 3/2003 | Lee | 345/418 |
| 2004/0131254 A1 | 7/2004 | Liang et al. | |
| 2004/0240542 A1 | 12/2004 | Yeredor et al. | |
| 2006/0062480 A1 | 3/2006 | Fujiyama et al. | |
| 2006/0067562 A1 | 3/2006 | Kamath et al. | |
| 2006/0215880 A1 * | 9/2006 | Berthilsson et al. | 382/103 |
| 2007/0035622 A1 | 2/2007 | Hanna et al. | |

FOREIGN PATENT DOCUMENTS

CN    1801930 A    7/2006

OTHER PUBLICATIONS

Hampapur, Arun. "S3-R1: The IBM Smart Surveillance System—Release 1". http://www.research.ibm.com/peoplevision/IBMS3-R1Overview.pdf.
Hampapur, Arun et al. "Smart Surveillance: Applications, Technologies and Implications". http://www.research.ibm.com/peoplevision/PCM03.PDF.
Wan Qin, et al, "Research and Implementation of Detecting and Tracking Multiple Moving Objects Method", School of Electronic & Information Engineering, Hunan University, pp. 199-202 (English abstract only).

* cited by examiner

*Primary Examiner* — Kevin Bates
(74) *Attorney, Agent, or Firm* — Matthew Chung; Hoffman Warnick LLC

(57) ABSTRACT

A system, method and program product for providing a video surveillance system that enhances object detection by utilizing feedback from a tracking system to an object detection system. A system is provided that includes: a moving object detection system for detecting moving objects in a video input; an object tracking system for tracking a detected moving object in successive time instants; and a tracker feedback system for feeding tracking information from the object tracking system to the moving object detection system to enhance object detection.

26 Claims, 2 Drawing Sheets

SYSTEM AND METHOD FOR MANAGING THE INTERACTION OF OBJECT DETECTION AND TRACKING SYSTEMS IN VIDEO SURVEILLANCE

FIELD OF THE INVENTION

This disclosure relates generally to video surveillance and more particularly to a surveillance system and method that utilizes feedback from a tracking system to a moving object detection system to enhance object detection.

BACKGROUND OF THE INVENTION

In automated video surveillance systems, a computer processes video from surveillance cameras to detect "interesting" activity, where that interesting activity can be any motion within the field of view of the camera. In a typical video surveillance system, moving objects are first detected by a detector, e.g., using "background subtraction" (BGS) or some other technique, and are then tracked by a tracker. Object detection utilizes a set of technologies that can detect moving objects in a video sequence generated by a static camera. The detection techniques are tolerant to changes in natural lighting, reasonable changes in the weather, distracting movements (like trees waving in the wind), and camera shake. Object tracking utilizes a set of technologies that can track the shape and position of multiple objects as they move around a space that is monitored by a static camera. Current techniques attempt to handle significant occlusions as objects interact with one another.

For simplicity, the detector and tracker are typically connected in a feed-forward manner with information being passed from the detector to the tracker. In other words, once a moving object is detected by the detector, information about the object (e.g., position, shape, size, color, motion, etc.) can be passed to the tracker, which can utilize the information to track the movement of the object.

Examples of such systems are for example described in US Patent Application No. 2006/0067562 entitled "Detection of moving objects in a video," filed on Mar. 30, 2006 by Kamath et al.; as well as "Smart Surveillance System" A. Hampapur, L. Brown, J. Connell, S. Pankanti, A. W. Senior, and Y.-L. Tian, *Smart Surveillance: Applications, Technologies and Implications*, IEEE Pacifc-Rim Conference on Multimedia, Singapore, December 2003, the contents of which are hereby incorporated by reference.

Unfortunately, there are a number of problems in utilizing the aforementioned feed forward arrangement of BGS followed by tracking. One such issue is referred to as "healing," in which a moving object stops and is incorporated into the background, or a static object moves away and the hole is adapted into the background. In a very simple system, this may happen by a slow blurring of the color of a background pixel towards a new value. When this occurs, the object detector may lose its fix on the object. Accordingly, a need exists for a more robust video surveillance system to eliminate such issues.

SUMMARY OF THE INVENTION

The present invention relates to a system, method and program product in which tracking information is passed from the tracker back to the detector to improve moving object detection performance. In one embodiment, there is a video surveillance system for identifying and tracking moving objects in a video input, comprising: a moving object detection system for detecting moving objects in the video input; an object tracking system for tracking a moving object in successive time instants; and a tracker feedback system for feeding tracking information from the object tracking system to the moving object detection system to enhance object detection.

In a second embodiment, there is a computer program product stored on a computer readable medium for identifying and tracking moving objects in a video input, which when executed, causes a computer to perform functions comprising: detecting moving objects in the video input; tracking a moving object in successive time instants; using tracking information about the moving object to enhance the detection of moving objects in successive time instants; and outputting surveillance output.

In a third embodiment, there is a method of identifying and tracking moving objects in a video input, comprising: detecting moving objects in the video input by analyzing pixel data; tracking a detected moving object in successive time instants; using tracking information about the detected moving object to enhance the detection of moving objects in successive time instants; and outputting surveillance output.

In a fourth embodiment, there is method for deploying a system for identifying and tracking moving objects in a video input, comprising: providing a computer infrastructure being operable to: detect moving objects in the video input by analyzing pixel data; track a detected moving object in successive time instants; use tracking information about the detected moving object to enhance the detection of moving objects in successive time instants; and output surveillance output.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

Figure 1:
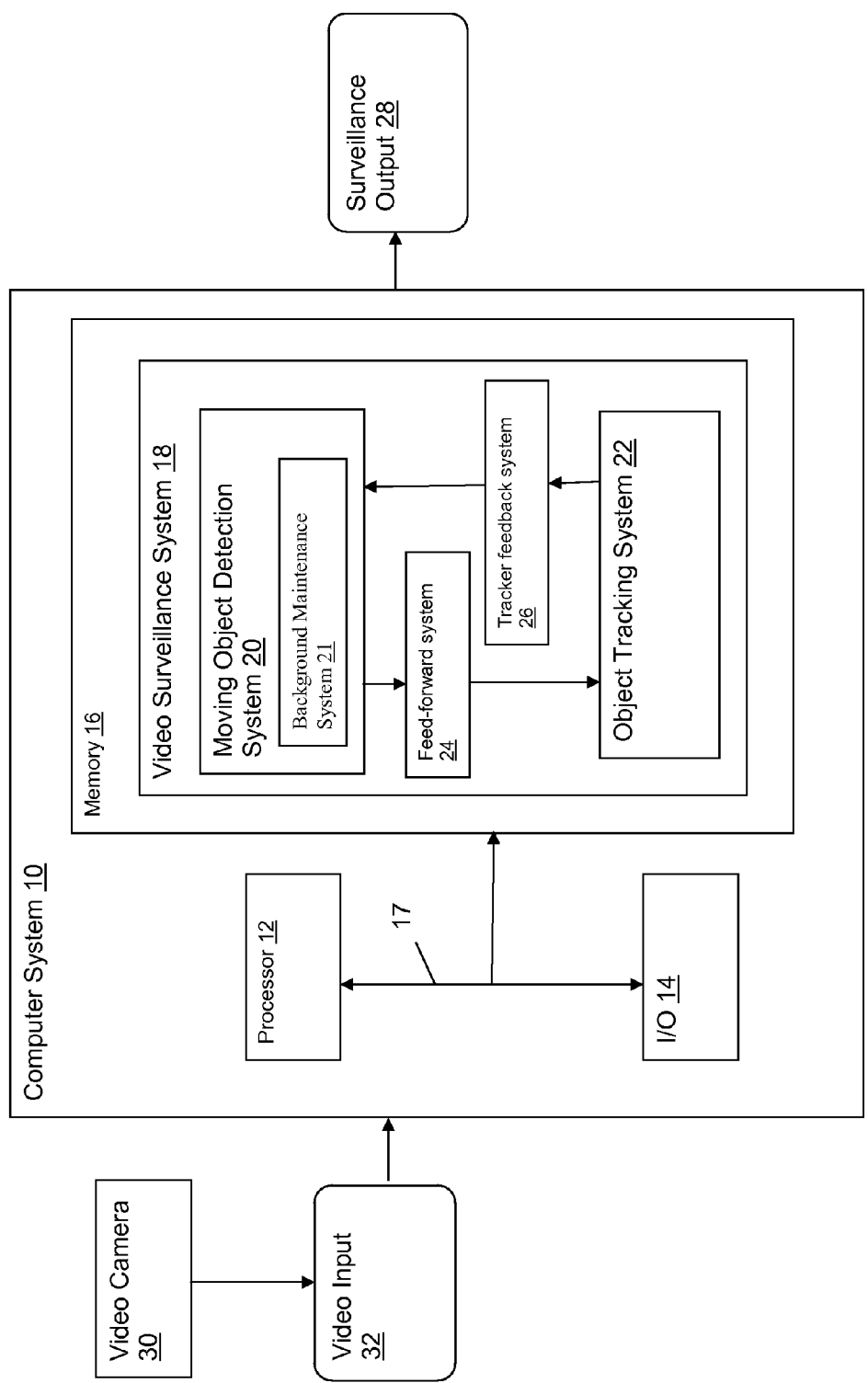
FIG. 1 depicts a computer system having a video surveillance system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As noted above, the object detection and tracking of automated surveillance systems generally utilize numerous subsystems, including one that identifies moving objects, and one that tracks the movement of identified objects. FIG. 1 depicts a computer system 10 comprising an illustrative embodiment of a video surveillance system 18 that includes both a moving object detection system 20 and an object tracking system 22 for performing the aforementioned functions. Other subsystems are not shown for simplicity.

Video surveillance system 18 receives video input 32 from a source such as a video camera 30, and outputs a surveillance output 28. Surveillance output 28 may, for example, comprise a video stream showing the highlighted movement of a tracked object, a still picture showing the path of tracked object against a fixed background, a sequence of coordinates or any other type of relevant data associated with the movement of a tracked object.

Object detection is generally accomplished with a technique such as background subtraction (or adaptive background subtraction) in which each video frame of the video input 32 is compared against a reference or background model, e.g., using a background maintenance system 21. Pixels in the current frame that deviate significantly from the background are considered to be part of a moving object. Accordingly, moving object detection system 20 operates at the "pixel" level and connects the pixels as a blob which belongs to an object to detect moving objects in each frame.

Once a moving object has been detected, feed-forward system 24 can pass the moving object information (e.g., position, size, color, etc.) to object tracking system 22, which can then track the object from frame to frame using features extracted to describe the object in each frame. Illustrative features may include the coordinates of the centroid of an object, its size, its color, its shape, etc. The tracking can be done using well known algorithms such as a Kalman filter or motion correspondence. Accordingly, object tracking system 22 operates at the "object" level to track objects from frame to frame (or in successive time instants).

As noted above, prior art background subtraction techniques have limitations in their ability to precisely identify moving objects. To enhance this process, the present embodiments include a tracker feedback system 26 that collects tracking information from the object tracking system 22, and passes the information back to the moving object detection system 20. Tracking information may include any data associated with a tracked object, for example, position, color, size, trajectory, shape, speed, tracking states (e.g., an object that has stopped moving, been abandoned, removed from the view, occluded, etc.).

Moving object detection system 20 can then use the tracking information for any purpose. For example, moving object detection system 20 can use the "object" based information to: prevent a tracked object from being incorporated into the background (even slightly); know when a moving object has stopped and determine a point in time when the object should be "pushed" into the background; maintain a record of historically "pushed" objects (e.g., parked cars) and their appearances; and "pop" them from the background when the object again moves. Such applications overcome a number of problems with "ghosting" that occur in prior art background subtraction algorithms when a moving object and the area it vacated in the background are both treated as "foreground regions."

The use of a tracker feedback system 26 can also improve on the detection performance of object detection system 20 by turning a 1-class detection problem ("is this pixel background or <anything else>?") into a 2-class classification problem ("is this pixel background, an object, or <anything else>?") with lower error. For example, consider an object of color C1 that moves in front of a background of color C2 where C1 is very similar to C2 and falls within the normal tolerance for background pixels. The problem for the moving object detection system 20 usually cast as "is this pixel of color C2", which will be incorrectly answered "Yes" for some pixels of color C1, now becomes one of determining whether a pixel was of color C1 or C2. Using tracking information readily available from the object tracking system 22 (e.g., an appearance model or motion characteristics previously collected when for instance the object passed in front of a distinctive background C3), the decision boundary for this classification problem can be more precisely known, which makes it easier to distinguish C1 from C2. Thus a more accurate detection of the object can be determined by using tracking information (e.g., shape and size information) as opposed to using less-accurate detection achieved by background subtraction alone.

Figure 2:
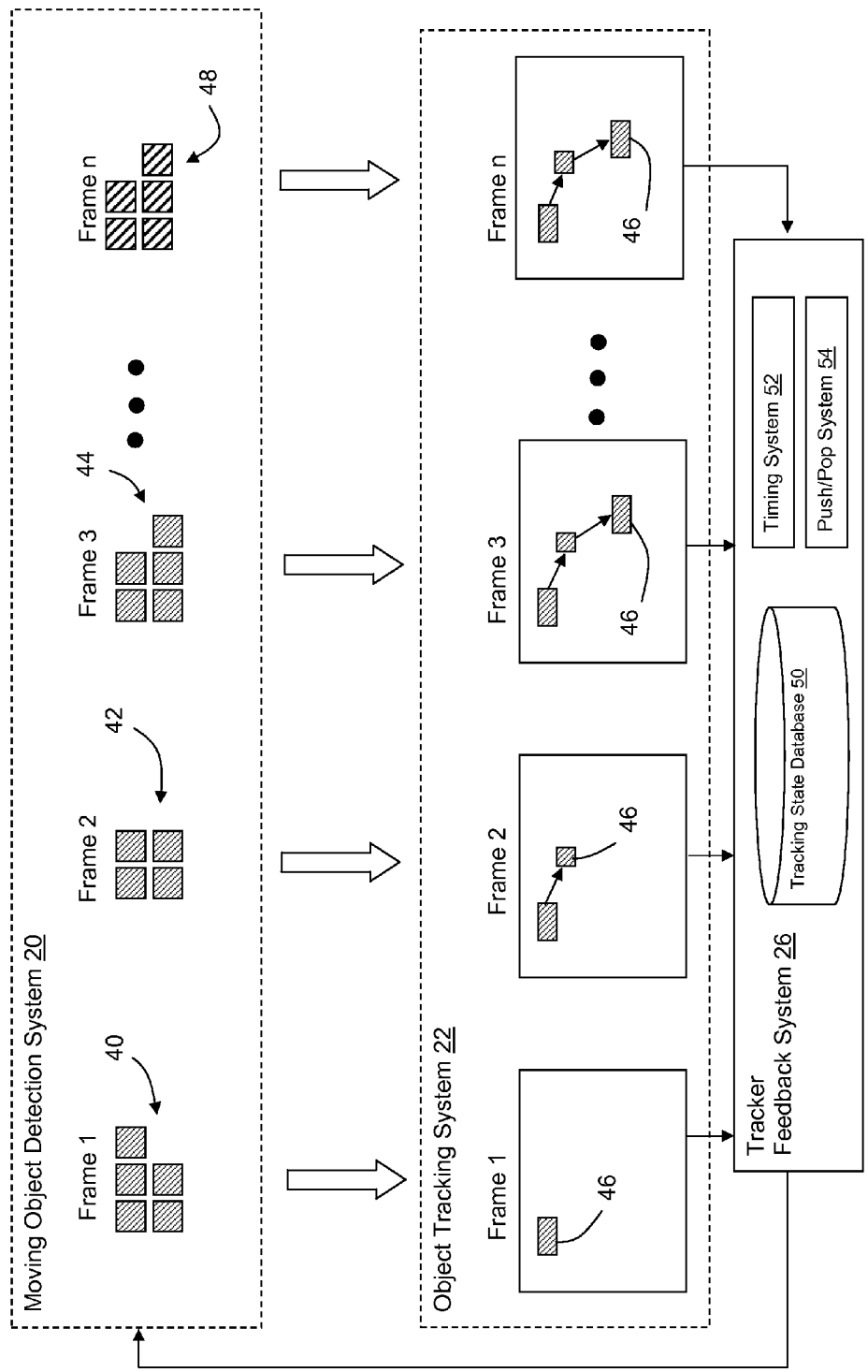
FIG. 2 depicts a simplified illustration of an implementation of the video surveillance system of FIG. 1 in accordance with an embodiment of the present invention.

FIG. 2 depicts a simplified illustrative example of an implementation of how the tracker feedback system 26 operates. In this example, moving object detection system 20 identifies a set of foreground pixels 40, 42, 44 in each of Frame 1, Frame 2 and Frame 3, respectively, which are believed to form a moving object. After each frame, the pixel information is passed to object tracking system 22, which identifies/highlights/locates the object 46 within the video frame. Thus, as the frames progress, the path or movement of object 46 is tracked by object tracking system 22.

In one illustrative embodiment, tracker feedback system 26 collects tracking information about the object (e.g., size, color, shape, tracking state, etc.) and passes it back to moving object detection system 20 after each frame. Moving object detection system 20 then uses the tracking information to facilitate the detection process in the next frame or successive time instant, e.g., by providing a boundary, color, position, etc., associated with the object.

In a further illustrative embodiment, tracker feedback system 26 is utilized to facilitate the processing of "stopped" objects. For example, as shown, object 46 does not move between Frame 3 and Frame n. This may for instance be typical of a car parking or stopping at a red light. Tracker feedback system 26 can, for example, store the information in a tracking state database 50, and inform moving object detection system 20 that it should process the set of pixels 48 associated with the "stopped" object as a moving object, even though it is not moving. Such "moving object" processing may include slowing or halting the background update procedure of an adaptive background maintenance scheme for all pixels considered to be part of the moving object so that the stopped object is not incorporated into the background. Alternatively, tracker feedback system 26 can inform moving object detection system 20 that it should process the set of pixels 48 associated with the "stopped" object as background. This may involve the moving object detection system 20 "pushing" the object into the background model (that is, updating its model of the background appearance to match the now stopped object, for all pixels which correspond to that object) which will result in the object no longer being detected as "foreground".

A timing system 52 may be utilized to dictate when the "stopped" object should no longer be considered a moving object, and thus inform moving object detection system 20 to allow the set of pixels 48 to be pushed to the background. Such a timing system 52 may measure the real elapsed time, the number of video frames observed, or involve a more complex decision making process that takes into account other factors, such as the previous behavior, speed or type of the object or other objects, the time of day, weather etc. A push/pop system 54 may also be utilized to notify moving object detection system 20 to push or pop objects tracked in the tracking state database 50 to and from the background.

In further embodiments, tracker feedback system 26 can provide tracking information to the background maintenance system 21 about tracked objects which causes the action of the background maintenance procedure to be altered (e.g., turned on, off or have update rates changed) in the vicinity of moving objects. Furthermore, when the moving object detection system 20 detects motion in the vicinity of a previously stopped object, and a newly detected moving object is similar to the previously stopped object, then the object tracking system 22 may "pop" the object from the background (that is, use the appearance of the previously stopped object for initialization) and the moving object detection system 20 may use the appearance of the previously stopped, and the background which it occluded when it stopped, object to adjust its determination of which pixels are part of the detected moving object.

It should be understood that other applications of tracker feedback system 26 not specifically discussed herein may be utilized and are intended to fall within the scope of the claimed invention.

Referring again to FIG. 1, it is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a video surveillance system 18 could be created, maintained and/or deployed by a service provider that offers the functions described herein for customers. That is, a service provider could offer to deploy or provide the ability to analyze video input 32 as described above.

It is understood that in addition to being implemented as a system and method, the features may be provided as a program product stored on a computer-readable medium, which when executed, enables computer system 10 to provide a video surveillance system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A video surveillance system comprising:
   a computer system for identifying and tracking moving objects in a video input by performing a method comprising:
   tracking a set of tracked moving objects in the video input for a first time instant of the video input and generating tracking information corresponding to the set of tracked moving objects based on the tracking, wherein the tracking information includes an appearance model for each moving object in the set of tracked moving objects and a set of motion characteristics for each moving object in the set of tracked moving objects; and detecting a set of moving objects in a subsequent time instant of the video input subsequent to the first time instant, wherein the detecting includes:

for a newly detected moving object in the subsequent time instant, initially detecting the newly detected moving object in the video input using background subtraction; and for a moving object in the set of tracked moving objects, subsequently detecting the moving object in the video input using the tracking information, wherein the tracking information is used to enhance the subsequent detection of the moving object against a background of the video input using the appearance model and to directly classify pixel data corresponding to a frame of the video input as one of: the background, the moving object, or an unknown object using the set of motion characteristics for the moving object, wherein the classifying is performed in a single classification step.

2. The video surveillance system of claim 1, wherein the set of motion characteristics includes a tracking state, wherein the tracking state is selected from the group consisting of: an object that is moving, an object that has stopped moving, a moving object that has been occluded, and a moving object that is out of view.

3. The video surveillance system of claim 1, wherein the subsequently detecting ceases classifying the moving object as a foreground object in response to the moving object stopping.

4. The video surveillance system of claim 1, wherein the subsequently detecting continues detecting the moving object using the appearance model after the moving object has stopped.

5. The video surveillance system of claim 1, wherein the set of motion characteristics includes timing information, and wherein the subsequently detecting includes determining when a stopped moving object should no longer be detected based on the timing information.

6. The video surveillance system of claim 1, wherein the computer system includes a tracking state database for storing the tracking information about moving objects in the video input.

7. The video surveillance system of claim 1, wherein the subsequently detecting includes determining when the moving object should be pushed into or popped from a background of the video input based on the set of motion characteristics for the moving object.

8. The video surveillance system of claim 1, wherein the initially detecting includes comparing pixel data corresponding to a frame of the video input to stored pixel data corresponding to a background.

9. The video surveillance system of claim 1, wherein the subsequently detecting utilizes the tracking information to adjust a preliminary determination of what pixels corresponding to a frame of the video input are part of a detected moving object based on background subtraction.

10. A computer program product stored on a computer readable storage device for identifying and tracking moving objects in a video input, which when executed, causes a computer to perform a method comprising:

tracking a set of tracked moving objects in the video input for a first time instant of the video input and generating tracking information corresponding to the set of tracked moving objects based on the tracking, wherein the tracking information includes an appearance model for each moving object in the set of tracked moving objects and a set of motion characteristics for each moving object in the set of tracked moving objects; and detecting a set of moving objects in a subsequent time instant of the video input subsequent to the first time instant, wherein the detecting includes:

for a newly detected moving object in the subsequent time instant, initially detecting the newly detected moving object in the video input using background subtraction; and for a moving object in the set of tracked moving objects, subsequently detecting the moving object in the video input using the tracking information, wherein the tracking information is used to enhance the subsequent detection of the moving object against a background of the video input using the appearance model and to directly classify pixel data corresponding to a frame of the video input as one of: the background, the moving object, or an unknown object using the set of motion characteristics for the moving object, wherein the classifying is performed in a single classification step.

11. The computer program product of claim 10, wherein the set of motion characteristics includes a tracking state, and wherein the tracking state is selected from the group consisting of: an object that is moving, an object that has stopped moving, a moving object that has been occluded, and a moving object that is out of view.

12. The computer program product of claim 10, wherein the subsequently detecting ceases classifying the moving object as a foreground object in response to the moving object stopping.

13. The computer program product of claim 10, wherein the subsequently detecting continues detecting the moving object using the appearance model after the moving object has stopped.

14. The computer program product of claim 10, wherein the set of motion characteristics includes timing information, and wherein the subsequently detecting includes determining when a stopped moving object should no longer be detected based on the timing information.

15. The computer program product of claim 10, wherein the subsequently detecting includes determining when a moving object should be pushed into or popped from a background of the video input based on the set of motion characteristics for the moving object.

16. The computer program product of claim 10, wherein the initially detecting includes comparing pixel data corresponding to a frame of the video input to stored pixel data corresponding to a background.

17. The computer program product of claim 10, wherein the subsequently detecting utilizes the tracking information to adjust a preliminary determination of what pixels corresponding to a frame of the video input are part of a detected moving object based on background subtraction.

18. A method of identifying and tracking moving objects in a video input, comprising:

tracking a set of tracked moving objects in the video input for a first time instant of the video input and generating tracking information corresponding to the set of tracked moving objects based on the tracking, wherein the tracking information includes an appearance model for each moving object in the set of tracked moving objects and a set of motion characteristics for each moving object in the set of tracked moving objects; and detecting a set of moving objects in a subsequent time instant of the video input subsequent to the first time instant, wherein the detecting includes:
for a newly detected moving object in the subsequent time instant, initially detecting the newly detected moving object in the video input using background subtraction; and
for a moving object in the set of tracked moving objects, subsequently detecting the moving object in the video input using the tracking information, wherein the tracking information is used to enhance the subsequent detection of the moving object against a background of the video input using the appearance model and to directly classify pixel data corresponding to a frame of the video input as one of: the background, the moving object, or an unknown object using the set of motion characteristics for the moving object, wherein the classifying is performed in a single classification step.

19. The method of claim 18, wherein the set of motion characteristics includes a tracking state, and wherein the tracking state is selected from the group consisting of: an object that is moving, information about an object that has stopped moving, a moving object that has been occluded, and a moving object that is out of view.

20. The method of claim 18, wherein the subsequently detecting ceases classifying the moving object as a foreground object in response to the moving object stopping.

21. The method of claim 18, wherein the subsequently detecting continues detecting the moving object using the appearance model after the moving object has stopped.

22. The method of claim 18, wherein the set of motion characteristics includes timing information, and wherein the subsequently detecting includes determining when a stopped moving object should no longer be detected based on the timing information.

23. The method of claim 18, wherein the subsequently detecting includes determining when a moving object should be pushed into or popped from a background of the video input based on the set of motion characteristics for the moving object.

24. The method of claim 18, wherein the initially detecting includes comparing pixel data corresponding to a frame of the video input to stored pixel data corresponding to a background.

25. The method of claim 18, wherein the subsequently detecting utilizes the tracking information to adjust a preliminary determination of what pixels corresponding to a frame of the video input are part of a detected moving object based on background subtraction.

26. A method for deploying a system for identifying and tracking moving objects in a video input, comprising:
providing a computer infrastructure configured to:
track a set of tracked moving objects in the video input for a first time instant of the video input and generate tracking information corresponding to the set of tracked moving objects based on the tracking, wherein the tracking information includes an appearance model for each moving object in the set of tracked moving objects and a set of motion characteristics for each moving object in the set of tracked moving objects; and
detect a set of moving objects in a subsequent time instant of the video input subsequent to the first time instant, wherein the detecting includes:
for a newly detected moving object in the subsequent time instant, initially detect the newly detected moving object in the video input using background subtraction; and
for a moving object in the set of tracked moving objects, subsequently detect the moving object in the video input using the tracking information, wherein the tracking information is used to enhance the subsequent detection of the moving object against a background of the video input using the appearance model and to directly classify pixel data corresponding to a frame of the video input as one of: the background, the moving object, or an unknown object using the set of motion characteristics for the moving object, wherein the classifying is performed in a single classification step.

* * * * *